Figure 1:
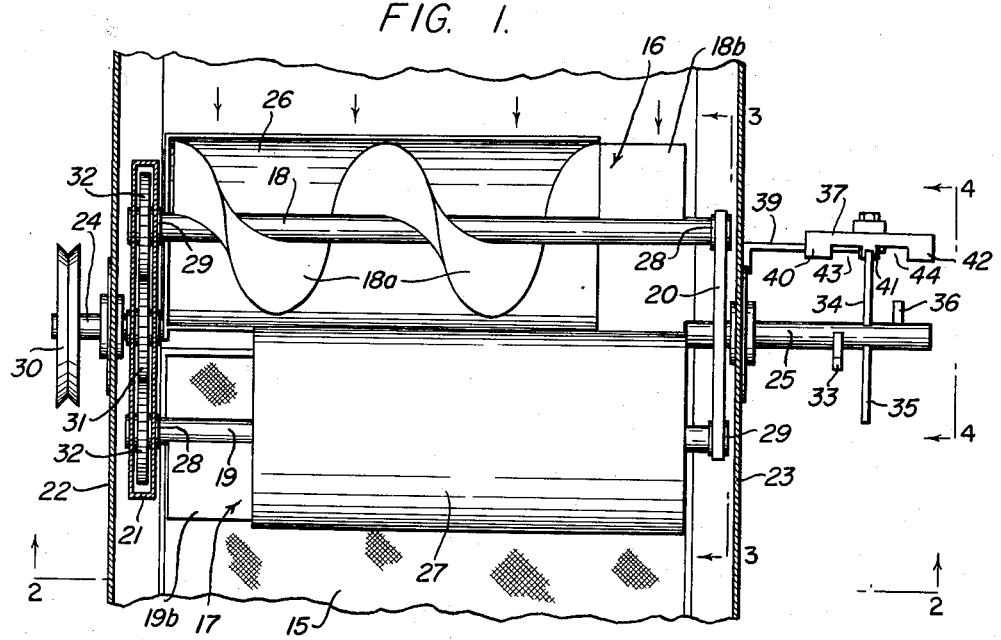

June 20, 1961  E. J. ZOLLINGER  2,989,183
CHAFFER SCREEN FEED FOR AGRICULTURAL COMBINE HARVESTER
Filed June 22, 1959  3 Sheets-Sheet 1

INVENTOR.
EZRA J. ZOLLINGER
BY
ATTORNEYS

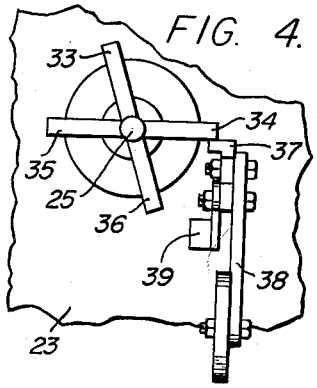
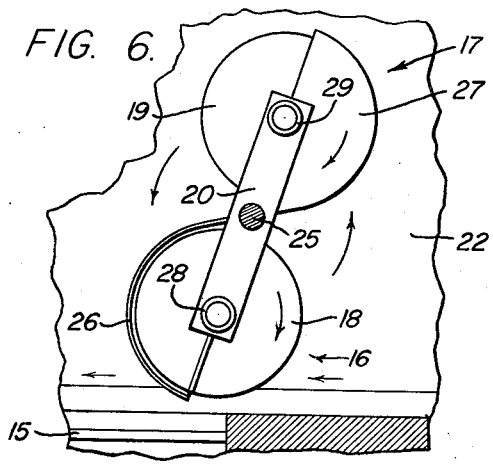
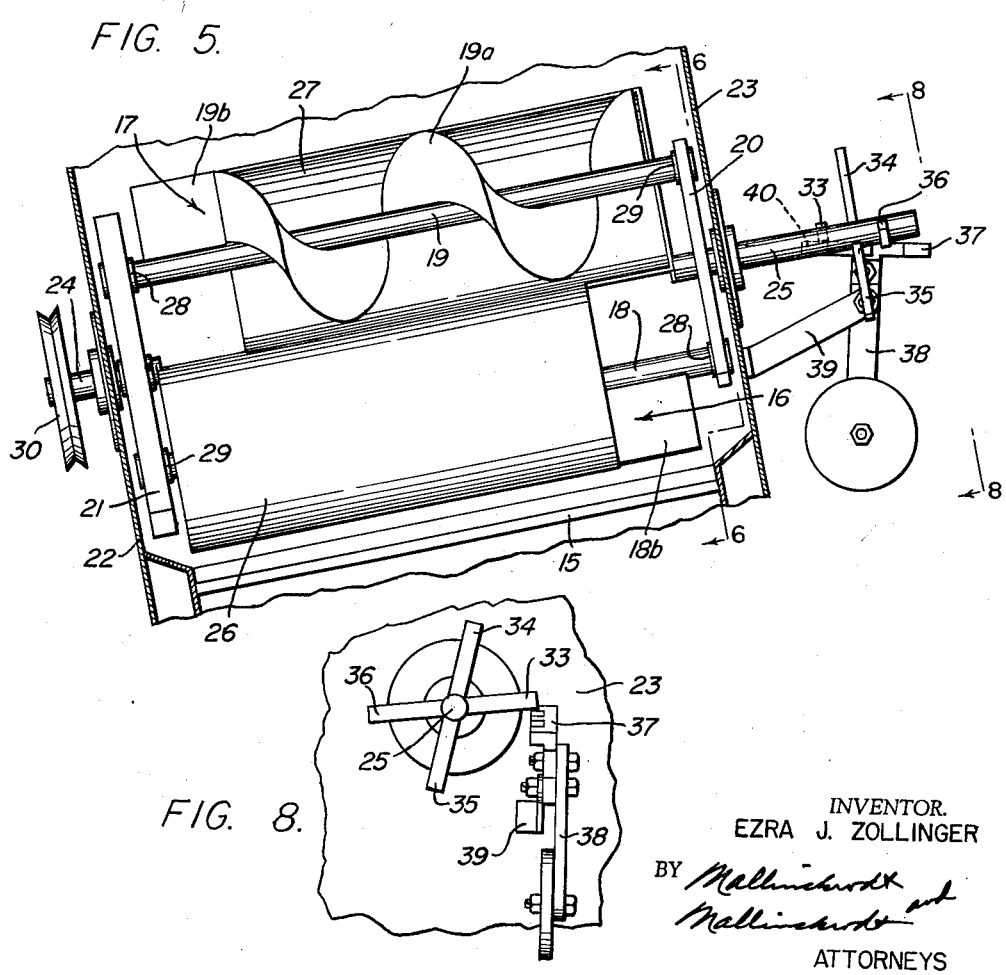

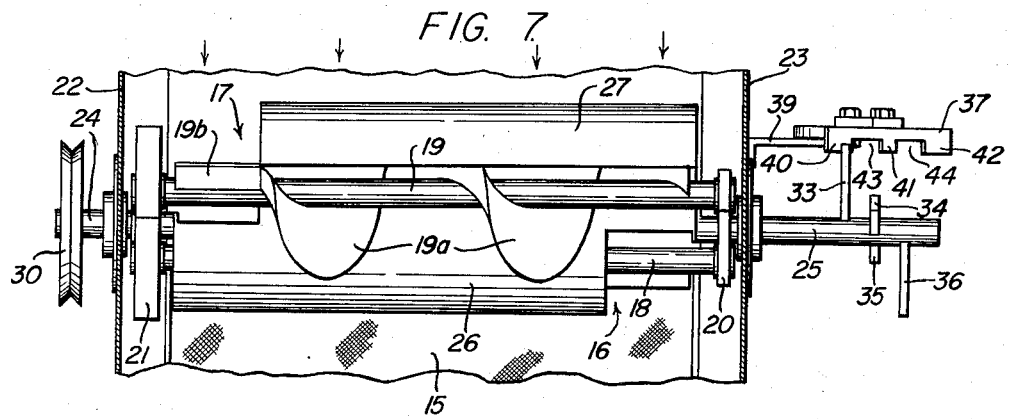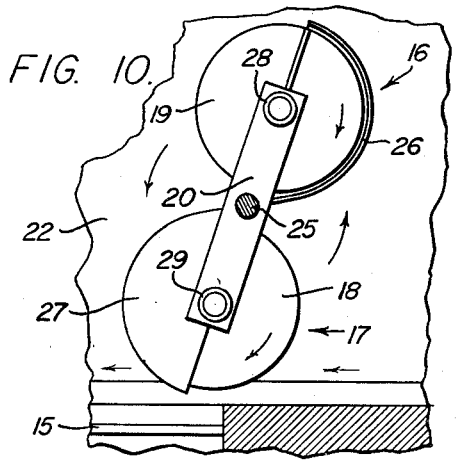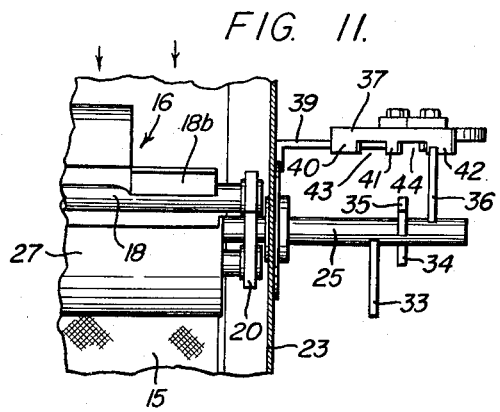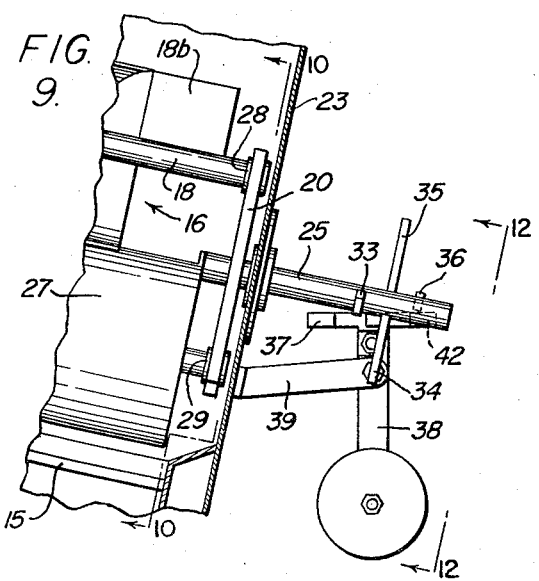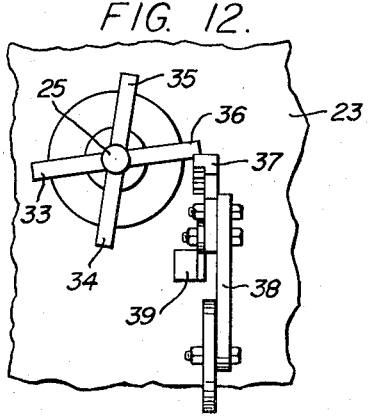

United States Patent Office 2,989,183
Patented June 20, 1961

2,989,183
CHAFFER SCREEN FEED FOR AGRICULTURAL
COMBINE HARVESTER
Ezra J. Zollinger, 230 E. 3rd South, Logan, Utah
Filed June 22, 1959, Ser. No. 822,062
4 Claims. (Cl. 209—254)

This invention relates to agricultural combine harvesters adapted for hillside operation, and is concerned with providing a combine harvester having grain distributing means interposed between the conventional threshing cylinder and grain-cleaning shoe or chaffer screen thereof, for enabling recovering of grain in an efficient manner when operating on sloping terrain.

In my copending application Serial No. 678,127, filed August 14, 1957, now Patent No. 2,893,558, I disclose a chaffer screen feed device utilizing a screw conveyer having reverse flights extending along mutually opposite half portions of its length and a pair of raisable and lowerable baffles extending along the lengths of such half portions of the screw conveyer at the discharge side thereof. Pendulum controlled mechanism is provided for selectively raising the baffle at the high side of the combine and for lowering the baffle at the low side when the combine is operating along a hillside, so that feed to the chaffer screen will be within the higher portion of its width, it being realized that both baffles are partly raised when the combine is operating on the level so that feed to the chaffer screen will be substantially uniform across the width of the screen.

I have now developed a chaffer screen feed device operating on the same general principles as the aforesaid device, but being an improvement thereon from an operative standpoint, inasmuch as the feed to the chaffer screen is brought to the high margin of such screen rather than to just above the mid-portion thereof.

Accordingly, an object of the present invention is to provide an improved version of the chaffer screen feed device disclosed in my afore-referred-to patent application.

A feature of the present device is the provision of two conveyer screws and associated baffles arranged in tandem across the path of feed to the chaffer screen, each screw being provided with unidirectional flights along all but a relatively short end portion of its length. The two screws are arranged in mutually reverse relationship in a common frame adapted to be rotated to selected positions to bring one or the other or neither of the conveyer screws and baffles into operative position with respect to the chaffer screen, and pendulum-controlled mechanism is provided for selectively determining the appropriate position when the combine is operating along a hillside.

Further objects and features of the invention will become apparent from the following detailed description of the presently preferred construction illustrated by way of example in the accompanying drawings.

Figure 2:
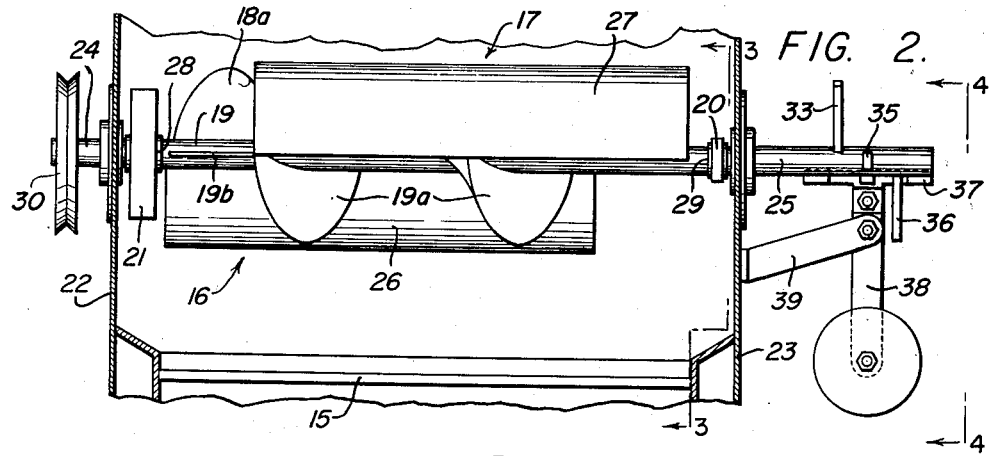
Figure 3:
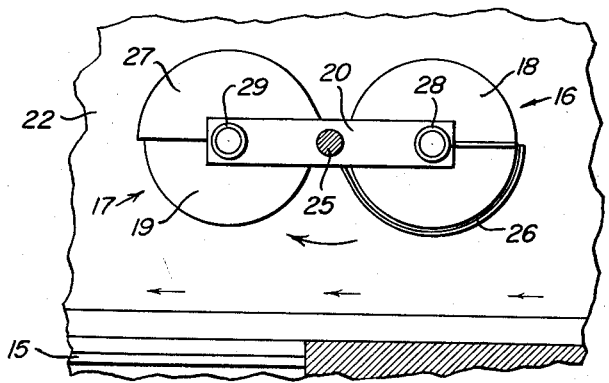

In the drawings:

FIG. 1 represents a fragmentary horizontal section through a typical installation of the invention in a standard combine harvester on level ground, the section being taken above the chaffer screen or grain-cleaning shoe thereof so as to illustrate the inventive structure in top plan, and the direction of travel of material being indicated by arrows;

FIG. 2, a fragmentary, transverse, vertical section taken along the line 2—2 of FIG. 1;

FIG. 3, a fragmentary, longitudinal, vertical section taken along the line 3—3 of FIGS. 1 and 2;

FIG. 4, a similar section taken along the line 4—4 of FIG. 1;

FIG. 5, a view corresponding to that of FIG. 2, but illustrating the combine during operation on a hillside, with the grain-distributing or chaffer screen feed device rotated so that one of the conveyer screws is in position to convey the feed material transversly of the screen to its high margin;

FIG. 6, a view corresponding to that of FIG. 3, but taken along the line 6—6 of FIG. 5;

FIG. 7, a view corresponding to that of FIG. 1, but somewhat more fragmentary in character and taken when thec ombine and chaffer screen feed device are in the hillside position of FIGS. 5 and 6;

FIG. 8, a view corresponding to that of FIG. 4, but taken on the line 8—8 of FIG. 5;

FIG. 9, a view corresponding to those of FIGS. 2 and 5, but more fragmentary in character and taken with the machine operating in the reverse direction on the hillside, so the combine tilts oppositely and the other conveyer screw is in operating position with respect to the chaffer screen;

FIG. 10, a view corresponding to those of FIGS. 3 and 6 but taken along the line 10—10 of FIG. 9;

FIG. 11, a view corresponding to those of FIGS. 1 and 7, but more fragmentary in character and taken with respect to the operating position of FIGS. 9 and 10; and FIG. 12, a view corresponding to those of FIGS. 4 and 8 but taken on the line 12—12 of FIG. 9.

Referring to the drawings:

The agricultural combine harvester which is here partially illustrated in connection with the device of the invention is a standard type. As is conventional, a mixture of grain and chaff is fed in the direction of the arrows, FIGS. 1, 7, and 11, from the threshing cylinder (not shown) toward the feed end of the grain-cleaning shoe or chaffer screen 15 by some type of conveyance means (not shown) which usually takes different forms in different models of combines.

Regardless of the particular type of conveyance means used to transport the grain and chaff mixture from the threshing cylinder to the chaffer screen, the inventive structure is disposed at the feed end of the chaffer screen.

The grain-distributing or chaffer sceren feed device of the invention comprises, in the particular form illustrated, two mutually reverse, conveyer screw and baffle assemblies 16 and 17 arranged in tandem with respect to the chaffer screen 15. The respective conveyer screws 18 and 19 of such assemblies are journaled at opposite ends of a frame member 20 and a gear casing 21, so as to form therewith a rectangular frame which is itself journaled for rotation in opposite side walls 22 and 23 of the combine harvester by means of stub shaft extensions 24 and 25, rigid therewith.

The conveyer screws 18 and 19 have mutually reverse flights 18a and 19a, respectively, extending throughout the greater portions of their lengths and terminating in mutually opposite, rectilinear end portions 18b and 19b of relatively minor length which serve, in effect, as discharge paddles.

The baffles 26 and 27 of the assemblies 16 and 17, respectively, are fixed in position with respect to their corresponding conveyer screws, advantageously by rigid mounting on bearings 28 and 29, respectively, which journal the conveyer screws. They cover the conveying flights 18a and 19a, respectively, of the conveyer screws, but terminate at the discharge paddle portions 18b and 19b, whereby discharge occurs only along such paddle portions. While it is preferred to provide the paddle portions along the discharge end portions of the respective conveyer screws, they are not necessary. The spiral conveyer flights may merely terminate at such discharge end portions.

Conveyer screws 18 and 19 are rotated by connection of drive pulley 30 with a suitable power take-off of the combine. Drive pulley 30 is secured to one end of stub shaft 24, which extends from the aforementioned frame. Power is transmitted to the conveyer screws by a gear train within casing 21 made up of an intermediate drive gear 31, rigidly secured to the opposite end of stub shaft 24, and two oppositely disposed driven gears 32 rigidly secured to the ends of conveyer screws 18 and 19, respectively.

Not only are the two conveyer screws rotated by this drive arrangement as the combine travels through a field in its grain harvesting and threshing operation, but the entire frame of which such screws are a part moves pivotally to place one or the other of the screws in conveying position from either neutral position, where the two are at substantially the same level, as in FIG. 3, or from a tilted position, such as one or the other of the maximum tilted positions of FIGS. 6 and 10 and various tilted positions therebetween, depending upon the direction of transverse slope of the machine as it travels along a hillside or other sharply sloping terrain.

It is necessary, of course, to provide means responsive to the position of the combine with respect to the horizontal for selectively controlling the positions of the two screw conveyers at any given time. Such means are advantageously provided, in part, by four arms 33, 34, 35, and 36 radiating from the outer end of stub shaft 25 in predetermined staggered positions along such stub shaft, and, in part, by a movable, abutment stop plate 37 disposed in the rotative paths of such arms.

Stop plate 37 is rigidly secured to the upper end of a pendulum 38, which is pivotally mounted on a bracket arm 39. Its margin proximate the several arms is notched to provide three stop members 40, 41, and 42, FIG. 1, separated by indentations 43 and 44. The two intermediate arms 34 and 35 are diametrically opposed and aligned. The two arms 33 and 36 are diametrically opposed, but are spaced oppositely from intermediate arms 34 and 35 along the length of the shaft.

When the combine is traveling along the level, pendulum 38 hangs vertically, as in FIG. 2, thereby positioning stop plate 37 as in FIG. 1 so that intermediate arm 34, FIG. 1, abuts against intermediate stop member 41 and the conveyer screw frame does not rotate past the horizontal. This is the neutral position in which mixed grain and chaff is passed normally onto the chaffer screen 15, see FIG. 3.

When the terrain traversed by the combine slopes as in FIG. 5, the pendulum moves stop plate 37 to a horizontal position, in which arm 33 abuts against end stop member 40 and conveyer screw 18 with its baffle 26 is brought into conveying position with respect to the mixed grain and chaff tending to pile up along the low side of the machine.

When the terrain slopes oppositely, as in FIG. 9, pendulum 38 again moves stop plate 37 to a horizontal position, but now arm 36 abuts against end stop member 42 and conveyer screw 19 with its baffle 27 is brought into conveying position.

Intermediate arm 35 abuts intermediate stop member 41 the next time the combine travels on the level.

Whereas this invention is here illustrated and described with respect to a certain preferred form of the apparatus concerned, it is to be understood that various changes therein and various other structural arrangements may be made by those skilled in the art without departing from the scope of the claims which here follow.

I claim:

1. In a combine harvester having a chaffer screen for receiving a flow of mixed grain and chaff, a grain-distributing feed device positioned adjacent the feed end of said chaffer screen, said grain-distributing feed device comprising two mutually reverse conveyer screw and baffle assemblies arranged in tandem; means for bringing one or the other of said assemblies into operative position with respect to said flow of mixed grain and chaff or for maintaining both said assemblies in an inoperative position; and means responsive to the position of the combine with respect to the horizontal for selectively controlling the operation of the first-named means.

2. The grain-distributing feed device of claim 1, wherein the said first-named means comprises a rotatable frame in which the said assemblies are journaled, and means for rotating said frame into various positions selectively established by the second-named, control means.

3. The grain-distributing feed device of claim 2, wherein the rotatable frame includes a shaft mounting; and the said second-named, control means comprises arms radiating from said shaft mounting in predetermined positions, and a pendulum-actuated abutment stop for said arms, said stop being provided with openings at predetermined positions permitting passage of respective arms when aligned therewith.

4. The grain-distributing feed device of claim 3, wherein the means for rotating the frame into various positions comprises gearing arranged to drive the conveyer screws of the respective assemblies in common, and a drive for said gearing.

References Cited in the file of this patent
UNITED STATES PATENTS 2,893,558     Zollinger _____ July 7, 1959